Nov. 12, 1929.     M. E. SIPE     1,735,587
PISTON RING EXPANDER
Filed Dec. 22, 1928
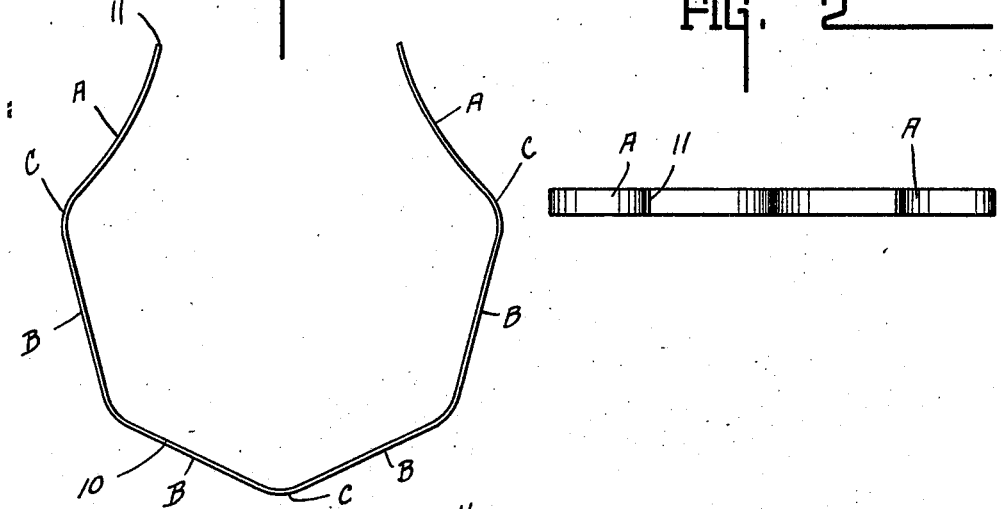
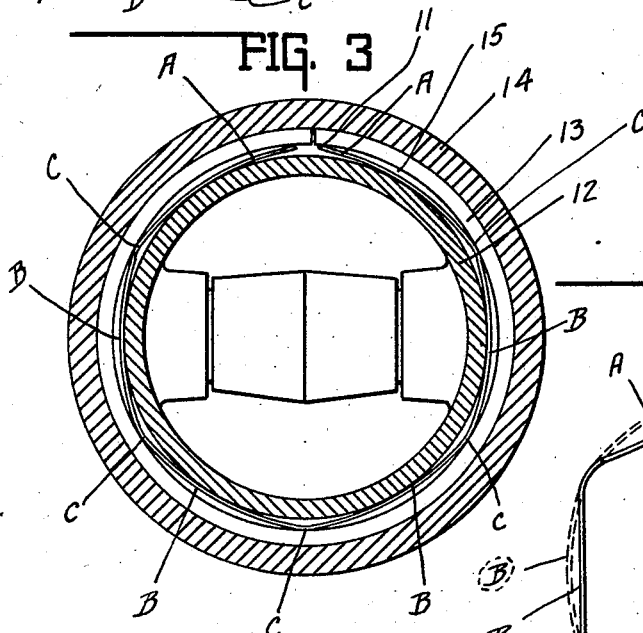
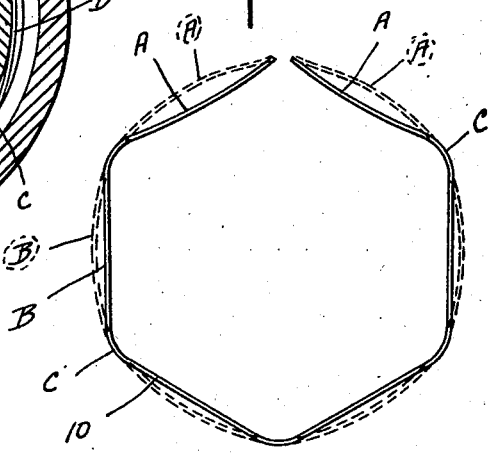
INVENTOR.
MARTIN E. SIPE.
BY
Lockwood, Lockwood, Galdsmith, & Galt
ATTORNEYS.

Patented Nov. 12, 1929

1,735,587

UNITED STATES PATENT OFFICE

MARTIN E. SIPE, OF INDIANAPOLIS, INDIANA

PISTON-RING EXPANDER

Application filed December 22, 1928. Serial No. 327,845.

This invention relates to an expander for piston rings for exerting an outward pressure thereon and maintaining said piston rings in engagement with the cylinder wall under spring tension.

Piston ring expanders have heretofore been manufactured with split ends and having corrugations or straight sides with intermediate bends. One of the difficulties of piston ring expanders of this character lies in the fact that there is an inherent weakness in the spring tension applied thereby to the piston ring at the split ends. This is for the reason that at the point of the ring where they are split, the free ends are permitted a degree of relative movement with respect to each other so as to eliminate the normal spring resistance inherent in the balance of the ring.

This may be observed by mounting an expander ring within a piston ring, and by pressing upon the piston ring, the position of the free ends of the expander ring may be noted by the decreased resistance to the pressure exerted at that point in the piston ring. This has the effect in action of maintaining an unequal balance of pressure such as will permit a minimum of pressure contact between the piston ring and the cylinder on that side wherein the free ends of the expander lie, which consequently tends to permit leakage of compression at that point.

It is the object of this invention to so construct and form an expander ring as to insure an equalized pressure with respect to the free ends and the remaining portions of the expander, whereby the expander will exert substantially the same pressure at the split ends as at any other points in its body. This is accomplished by forming that portion immediately adjacent the split ends with a greater degree of tension than the remaining portion of the expander so as to compensate for any free relative movement between the free ends. As shown herein, this is obtained by forming that portion of the expander adjacent the free ends with a reverse curve while the remaining sides or portions of the expander are formed substantially straight. This causes an equalization of the radial pressure on the piston ring about its entire circumference since the reverse curved portion adjacent the free ends tends to exert an increased pressure which compensates for the decreased pressure normally exerted at that point by the open free ends.

The full nature of the invention will be understood from the accompanying drawing and the following description and claims:

In the drawings, Fig. 1 is a plan view of the expander in normal position before application to the piston. Fig. 2 is a side elevation thereof. Fig. 3 is a section through a piston and cylinder showing the application of the expander thereto. Fig. 4 is a diagrammatical illustration showing the normal position of the expander when closed in full lines and the position thereof in dotted lines when under tension between the piston and piston ring.

In the drawings there is illustrated an expander ring 10 formed in the usual manner of thin spring steel, said ring being split at its ends, as indicated at 11. As shown herein, it is in a hexagonal form, although it may be in any other suitable form having a plurality of sides A and B with intermediate bends indicated at C. For purposes of illustration, the sides of the ring adjacent the split ends 11 are indicated by the letter A. The remaining sides of the ring are indicated by the letter B. Upon forming the ring the sides B are formed substantially straight, while the sides adjacent the split ends 11 are formed with a reverse curve to the general conformation of the ring.

Upon the ring being mounted between the piston 12 and piston ring 13 within the cylinder 14, said expander and piston ring 13 lying within the usual ring groove 15 in the piston, the expander ring is forced to the position illustrated in Fig. 3 so that all the sides A and B will have a tendency to bulge outwardly, the intermediate portions thereof exerting a radially inward force against the piston, while the bends C and free ends 11 exert a radially outward pressure against the piston ring.

As best illustrated in the diagrammatical Fig. 4, it will be noted that the distance between the normal position of the sides A and the position thereof when under tension is considerably greater than that of the sides B. Consequently there is greater deformation when the ring is in use between those sides adjacent the split ends 11 and the remaining sides, which greater deformation, owing to the spring tension of the metal, exerts a correspondingly greater pressure. Thus, the expander ring is caused to exert a greater pressure at and adjacent to the free split ends, which split free ends tend to reduce or decrease the pressure at that portion of the ring. Therefore, such increase and decrease in pressure compensate each other and accordingly equalize the pressure exerted by the ring about its entire periphery.

The invention claimed is:

1. The combination with a piston having a groove therein and a piston ring in said groove, of an expander ring adapted to be mounted in said groove intermediate said piston and ring, said expander ring being formed with a plurality of sides having intermediate bends connecting the same and split between two of said sides, said sides adjacent the split ends being normally reversely curved with respect to the general contour of said rings and the remaining sides being normally substantially straight, whereby said reversely curved sides are adapted to exert an increased pressure on said piston ring to compensate for the decrease in pressure thereon due to the split ends and thereby maintain a substantially equalized pressure upon said piston ring.

2. The combination with a piston having a groove therein and a piston ring in said groove, of an expander ring adapted to be mounted in said groove intermediate said piston and ring, said expander ring being formed with a plurality of sides having intermediate bends connecting the same and split between two of said sides, the sides adjacent the split ends of said ring being so formed as to exert a greater outward pressure when in operative position than the remaining sides so as to compensate for the decrease in operative pressure adjacent the free split ends thereof, whereby said ring will exert an equalized pressure about said piston ring.

In witness whereof, I have hereunto affixed my signature.

MARTIN E. SIPE.